United States Patent [19]

Kimura et al.

[11] Patent Number: 5,482,992

[45] Date of Patent: Jan. 9, 1996

[54] ROOM TEMPERATURE QUICK CURABLE ORGANOPOLYSILOXANE COMPOSITION EXCELLENT IN WATER RESISTANCE

[75] Inventors: Tsuneo Kimura; Kei Miyoshi; Masatoshi Arai, all of Matsuida, Japan

[73] Assignee: Shin-Etsu Chemical Co., Ltd., Tokyo, Japan

[21] Appl. No.: 328,515

[22] Filed: Oct. 25, 1994

[30] Foreign Application Priority Data

Oct. 26, 1993 [JP] Japan ..................... 5-289922

[51] Int. Cl.$^6$ .................. C08J 3/00; C08K 3/20; C08L 83/00; C08G 77/00
[52] U.S. Cl. .................. 524/588; 524/861; 524/863; 528/10; 528/12; 528/21; 528/25; 528/28
[58] Field of Search .................. 524/588, 861, 524/863; 528/10, 12, 21, 25, 28

[56] References Cited

U.S. PATENT DOCUMENTS 4,680,364  7/1987  Lucas ........................... 528/21
5,196,477  3/1993  Arai et al. ..................... 524/861
5,319,050  6/1994  Kimura et al. .................. 528/12

Primary Examiner—Paul R. Michl
Assistant Examiner—Patrick Niland
Attorney, Agent, or Firm—Oblon, Spivak, McClelland, Maier & Neustadt

[57] ABSTRACT

A room temperature curable rubber composition of a condensation curing type that comprises as a base polymer a diorganopolysiloxane or a polyoxyalkylene in which both ends of the molecular chain are blocked with a hydrolyzable silyl group, and a β-dicarbonyl compound and an amino group containing organic compound that are blended with the base polymer. Since the room temperature curable rubber composition is cured with water in the air and at the same time the dehydration condensation of the β-carbonyl group and the amino group produces water in the composition, the quick curability and deep curability are improved remarkably. In addition, since this dehydration condensation reaction is an irreversible reaction, the product produced by the condensation dehydration is hydrolyzed to prevent the amino group containing compound from being regenerated, and as a result the hydrophilic nature of the cured product is prevented from increasing not to damage the water resistance.

10 Claims, No Drawings

ROOM TEMPERATURE QUICK CURABLE ORGANOPOLYSILOXANE COMPOSITION EXCELLENT IN WATER RESISTANCE

BACKGROUND OF THE INVENTION

1. Field of the Invention

The present invention relates to a room temperature quick curable composition in which as a base polymer a diorganopolysiloxane or a polyoxyalkylene polymer is used, and more particularly to a room temperature quick curable composition of a condensation curable type that is excellent in quick curability, deep curability, and water resistance.

2. Description of the Prior Art

As room temperature quick curable compositions of a condensation curable type in which an organopolysiloxane or a polyoxyalkylene polymer is used as a base polymer, a one-liquid type composition wherein the amount of a crosslinking agent to be added for the base polymer is minimized to improve the rate of the crosslinking by hydrolysis and a two-liquid type composition wherein a crosslinking agent and a curing agent are packed separately are conventionally known.

However, the above one-liquid type composition is only quick in curing speed from the surface and a certain period of time is required to allow deep part to be cured, so that it is hardly said that the one-liquid type composition is quickly curable. On the other hand although the above two-liquid type composition is relatively excellent in deep curability, the two-liquid type composition has the defects that because the mixing ratio of the two liquids is not 1:1, the handling is troublesome and it is difficult to be suitably used, for example, by an automatic mixer. Further, to attain the curing completely in deep part, it is required that the amounts of the hydroxy groups at both ends of the base polymer and the crosslinking agent to be added are strictly prescribed or that water is added as a curing agent for deep part.

On the other hand, in the organopolysiloxane composition of an addition curable type, since the mixing ratio of the two liquids is 1:1, the workability is excellent, but generally a heating oven is needed for the curing. Further, since the curing catalyst is poisoned in the presence of an addition poison, the working atmosphere is restricted disadvantageously.

SUMMARY OF THE INVENTION

The present inventors previously suggested a room temperature quick curable composition that solved the above problems (Japanese Pre-examination Patent Publication (KOKAI) No. 5-279570). This composition comprises a diorganopolysiloxane or a polyoxyalkylene polymer wherein both ends of the molecular chain are blocked with a hydrolyzable silyl group, an organic compound having at least one C=O group in the molecule, and an organic compound having at least one $NH_2$ group in the molecule and is improved in quick curability at room temperature and deep curability by using the water that is concomitantly produced by the ketimine production reaction due to the dehydration condensation of the carbonyl group (C=O group) and the $NH_2$ group.

However, the results of the study made thereafter revealed that although the above composition was excellent in quick curability and deep curability, the problem of the water resistance, such as water resistance adhesive and electrical properties after dipping in water, was yet to be solved, and its application was very limited.

It is believed that such lowering of water resistance is greatly attributed to the primary amine remaining in the cured product and to solve this, it is attempted to add an α,β-unsaturated carbonyl group to change the primary amine to a secondary amine so that the water resistance may be improved. However, although the water resistance adhesive is improved, the problem of the electrical properties after dipping in water is remained yet unsolved and the application is still limited.

Therefore, an object of the present invention is to provide a room temperature quick curable organopolysiloxane or polyoxyalkylene polymer composition of a condensation curable type that is excellent in quick curability at room temperature and deep curability and also good in water resistance adhesive and electrical properties after dipping in water.

According to the present invention, there is provided a room temperature quick curable composition, comprising (A) a diorganopolysiloxane or a polyoxyalkylene polymer wherein both ends of the molecular chain are blocked with a hydrolyzable silyl group and that has a viscosity of 25 to 1,000,000 centistokes at 25° C., (B) a carbonyl compound having at least two carbonyl groups in the molecule, with one carbonyl group being in the beta position relative to the other carbonyl group, and (C) an organic compound having at least one $NH_2$ group in the molecule, with said components (B) and (C) being selected such that said carbonyl group in the beta position and the $NH_2$ group are reactive with each other.

That is, in the present invention, the carbonyl group in the beta position in the component (B) and the $NH_2$ group in the component (C) undergo a dehydration condensation reaction, producing water in deep part of the composition. Accordingly, the quick curability and deep curability of the composition are remarkably improved. In addition, since water is not blended as a deep part curing agent into the composition, problems, such as lowering of the workability due to the separation of water or an increase in thixotropy of the composition, could have been solved effectively.

More importantly, the dehydration condensation reaction between the carbonyl group in the beta position and the $NH_2$ group is represented by the following equation (1):

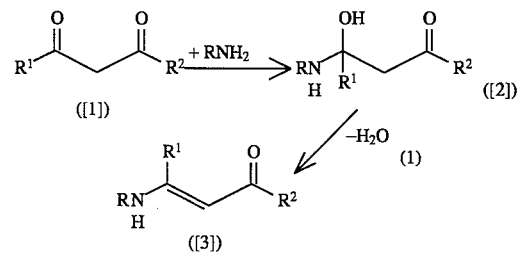

wherein R and $R^1$ each represent an organic group and $R^2$ represents an organic group or an alkoxy group, and this reaction is an irreversible reaction. Therefore, since the compound having an $NH_2$ group is not regenerated in the cured product, the hydrophilic nature of the composition is not increased, and as a result the water resistance and the electrical properties after dipping water are considerably improved.

For example, in the previous suggestion (see Japanese Pre-examination Patent Publication (KOKAI) No. 5-279570), the equilibrium reaction between an organic compound having a C=O double bond and an organic compound having an $NH_2$ group produces water and there is a ketimine compound immediately after the reaction. Thus, since this reaction is a reversible reaction, the ketimine compound is decomposed gradually in the presence of water to regenerate the organic compound having an $NH_2$ group. Since this regenerated compound increases the hydrophilic nature of the cured product, intrusion of water into the cured product becomes easy, which causes the water resistance of the cured product to be damaged extremely.

According to the present-invention, for a room temperature quick curable composition of a condensation curable type wherein an organopolysiloxane or a polyoxyalkylene polymer is used as a base, the quick curability and the deep curability can be improved remarkably without damaging the water resistance.

DETAILED DESCRIPTION OF THE PREFERRED EMBODIMENTS

Component (A)

The component (A) is a base polymer and at least one of diorganopolysiloxanes and polyoxyalkylenes is used as the component (A).

In the present invention, it is required that both ends of the molecular chain of any of these base polymers are blocked with a hydrolyzable silyl group. That is, due to the presence of the hydrolyzable groups, the polymer undergoes hydrolysis and polycondensation in the presence of water to form a rubberlike elastic cured product. The hydrolyzable silyl group is a group wherein at least one hydrolyzable group is bonded to a silicon atom. Examples of the hydrolyzable group include a carboxyl group, a ketoxime group, an alkoxy group, an alkenoxime group, an amino group, an aminoxy group, and an amido group. Particularly preferable hydrolyzable groups are ketoxime group, an alkoxy group, and an alkenoxime group.

The number of these hydrolyzable groups bonded to a silicon atom is not restricted one, and two or three such hydrolyzable groups may be bonded to one silicon atom. The silicon atom to which these hydrolyzable groups are bonded may of course have other organic groups. Preferably such organic groups are monovalent hydrocarbon groups, and more preferably monovalent hydrocarbon groups having 1 to 12 carbon atoms. Examples of the hydrocarbon group include an alkyl group having 1 to 6 carbon atoms, such as a methyl group, an ethyl group, and a propyl group, a cycloalkyl group having 6 to 12 carbon atoms, such as a cyclohexyl group, an alkenyl group having 2 to 6 carbon atoms, such as a vinyl group and an allyl group, and an aryl group having 6 to 12 carbon atoms, such as a phenyl group and a tolyl group, and corresponding substituted groups that are formed by replacing part of the hydrogen atoms of the above hydrocarbon groups by a halogen atom(s) or the like, such as a chloromethyl group, and a 3,3,3-trifluoropropyl group. Particularly preferable monovalent hydrocarbon groups are a methyl group, a phenyl group, and a 3,3,3-trifluoropropyl group.

It is required that the component (A), the base polymer, has a viscosity in the range of 25 to 1,000,000 cSt, and preferably in the range of 1,000 to 100,000 cSt, at 25° C. If the viscosity falls outside this range, such disadvantages arise that it becomes difficult to form a rubber cured product having satisfactory properties or the workability is lowered.

Among the above-described base polymers, as the diorganopolysiloxane, for example, a diorganopolysiloxane represented by the following general formula (2):

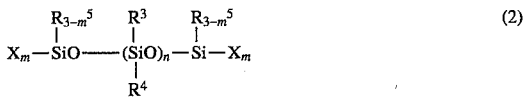

wherein $R^3$, $R^4$, and $R^5$, which are the same or different, each represent the above mentioned monovalent organic group, X's independently each represent a hydrolyzable group, m is an integer of 1 to 3, and n is a positive integer is appropriate.

Herein, the monovalent organic group represented by $R^3$, $R^4$, and $R^5$ includes organic groups other than the hydrolyzable groups given as examples for the above hydrolyzable silyl groups, and preferably the above-mentioned unsubstituted or substituted monovalent hydrocarbon groups. Further, n is generally an integer of 10 or more, and preferably 10 to 2,000, since this diorganopolysiloxane is to have a viscosity in the above mentioned range.

Among the above-mentioned base polymers, the polyoxyalkylene polymer includes, for example, a polyoxyalkylene polymer represented by the following general formula (3):

wherein $R^6$'s independently each represent a hydrogen atom or a linear or branched alkyl group having 2 to 12 carbon atoms, $R^7$'s independently represent a monovalent organic group, X has the same meaning as defined above, p is an integer of 1 to 500, and q and r are each an integer of 0 or 1.

The alkyl group represented by $R^5$ in the above general formula includes, for example, a methyl group, an ethyl group, and a propyl group. The organic group represented by $R^6$ includes, e.g., those exemplified by $R^2$ to $R^4$. The molecular weight of the polyoxyalkylene polymer represented by the above general formula (3) is preferably 1,000 to 30,000.

The oxyalkylene unit constituting the backbone chain of the polyoxyalkylene polymer represented by the above general formula (3) is preferably —$CH_2CH_2O$—, —$CH_2CH(CH_3)O$—, —$CH_2CH(CH_2CH_3$ )$O$—, or —$CH_2CH_2CH_2CH_2O$—, and more preferably —$CH_2CH(CH_3)O$— because it is easily available and in view of the cost. Of course, the oxyalkylene units constituting the backbone chain not only may be of one type of unit but also may be of two or more types of units that are mixed.

Among the polyoxyalkylene polymers represented by the general formula (3), preferred are $(MeO)_3SiCH_2O[CH_2CH(Me)O]_nCH_2Si(OMe)_3$, $(MeO)_3SiC_3H_6O[CH_2CH(Me)O]_nC_3H_6Si(OMe)_3$, $(MeO)_2MeSiC_3H_6O[CH_2CH(MeO]_nC_3H_6SiMe(OMe)_2$, $(MeO)_2MeSiC_3H_6O[CH_2CH(Et)O]_nC_3H_6SiMe(OMe)_2$, $(MeO)_2MeSiC_3H_6O[C_4H_8O]_nC_3H_6SiMe(OMe)_2$, $(MeO)_2PhSiC_2H_4O[CH_2CH(Me)O]_nC_2H_4SiPh(OMe)_2$, $(EtO)_3SiC_3H_6O[CH_2CH(Me)O]_nC_3H_6Si(OEt)_3$, $(CH_2=CMeO)_3SIC_3H_6O[CH_2CH(Me)O]_nC_3H_6Si(OMeC=CH_2)_3$, $(CH_2=CMeO)_2MeSiC_3H_6O[CH_2CH(Me)O]_nC_3H_6SiMe(OMeC=CH_2)_2$ and $(MeEtC=NO)_2ViSiCaH_6O[CH_2CH(Me)O]_nC_3H_6SiVi(ON=CMeEt)_2$ wherein Me, Et, Ph and Vi stand for methyl, ethyl, phenyl and vinyl groups, respectively.

Such a polyoxyalkylene polymer represented by the general formula (3) can be obtained by introducing the above-mentioned hydrolyzable silyl group to both ends of the backbone chain consisting of oxyalkylene units. Specific examples thereof include a method wherein an oxyalkylene polymer having ally groups at the ends and a hydrosilane having a hydrolyzable silyl group are subjected to an addition reaction in the presence of a platinum catalyst and a method wherein an oxyalkylene polymer having allyl groups at the ends and a halogenated alkylsilane having a hydrolyzable silyl group are subjected to a condensation reaction in the presence of metal sodium or metal potassium.

Component (B)

The component (B) is a carbonyl compound having at least two carbonyl groups in the molecule with one carbonyl group being in the beta position relative to the other carbonyl group (hereinafter referred to simply as "a β-dicarbonyl compound") and, as described above, reacts with the $NH_2$ group containing organic compound, the component (C), to generate water that serves as a curing agent in deep part of the composition.

This β-dicarbonyl compound exhibits the reaction as shown in the above equation (1), specifically has a molecular structure indicated at [1] in the equation (1) and possesses a group having two carbonyl groups with one carbon atom inbetween. Accordingly, to complete the above reaction, the carbon atom (alpha carbon atom) present between the two carbonyl groups of this β-dicarbonyl compound must not be a quaternary carbon atom and it is required that said alpha carbon atom has at least one hydrogen atom bonded thereto.

Typical examples of the β-dicarbonyl compound that satisfy the above conditions include, but are not limited to, an acetoacetic ester, such as methyl acetoacetate, ethyl acetoacetate, and propyl acetoacetate, and a diketone, such as, 2,4-pentanedione, 2,4-hexanedione, and 1,3-cyclohexanedione, and preferably the β-dicarbonyl compound includes methyl acetoacetate, and ethyl acetoacetate. Of course, besides these, γ-acetoacetoxypropyltrimethoxysilane that are silane coupling agents having, as a functional group, a group having two carbonyl groups with one carbon atom inbetween, various polymers and oligomers can be used. These β-dicarbonyl compounds can be used singly or as a combination of two or more.

The amount of the component (B) to be blended is such that the amount of the carboxyl group in the beta position that has the above reactivity is preferably in the range of 0.001 to 1 mol, and particularly in the range of 0.01 to 0.1 mol, per 100 mol of the component (A). If the amount is less than 0.001 mol, satisfactory deep curability cannot be exhibited while if the amount is over 1 mol, the obtainable elastic cured product fails to exhibit the intended physical properties.

Component (C)

As described above, the component (C), an organic compound having at least one $NH_2$ group (hereinafter simply referred to as "an amino group containing organic compound"), reacts with the component (B) to produce water that serves as a curing agent in deep part of the composition.

As the amino group containing organic compound, any amino group containing organic compound can be used so long as it has a reactive primary amino group that exhibits the reaction as shown by the above equation (1). Generally examples of such an amino group containing organic compound include amines, such as methylamine, ethylamine, butylamine, ethylenediamine, and aniline, silane coupling agents having an $NH_2$ group as a functional group, such as γ-aminopropyltriethoxysilane, and polymers and oligomers having $NH_2$ groups. In the present invention, in view of the steric hindrance at the time of the reaction of the component (B), particularly an amino group containing organic compound wherein the alpha carbon atom of the amino group is a primary carbon atom or a secondary carbon atom, such as methylamine, ethylamine, n-propylamine, isopropylamine, butylamine, cyclohexylamine, γ-aminopropyltriethoxysilane, α,ω-trimethylsiloxymethyl(γ-aminopropyl)polysiloxane and an amino group containing organic compound wherein the alpha atom of the amino group constitutes a part of an aromatic ring, such as aniline and toluidine, are suitably used. In particular, butylamine, γ-aminopropyltriethoxysilane, and α,ω-trimethylsiloxymethyl(γ-aminopropyl)polysiloxane are preferable. These amino group containing organic compounds are not required to be used singly and two or more of them can be used. Incidentally, an amino group containing organic compound wherein the alpha carbon atom of the amino group is a common tertiary carbon atom is poor in reactivity with the carbonyl group and cannot secure the desired effect in some cases.

Preferably tile amount of the component (C) to be blended is such that the amount of the primary amino group is in the range of 0.001 to 1 mol, and particularly in the range of 0.01 to 0.1 mol, per 100 g of the component (A). If the amount is less than 0.001 mol, satisfactory deep curability is not exhibited while if the amount is over 1 mol, the obtainable elastic cured product fails to exhibit the intended physical properties.

Process of the Preparation of the curable composition

The present composition can be obtained as a one-liquid type room temperature quick curable composition by uniformly mixing prescribed amounts of the components (A) to (C) in a dry atmosphere. In this case, to secure the shelf stability, the component (A) or the component (B) can be micro-capsulated and blended to form a one-liquid type room temperature quick curable composition or they can be formed into two packs, which can be mixed when used. In the later case, the two liquids may be mixed in a 1:1 ratio.

Further, unless the quick curability at room temperature and the deep curability are not impaired, various ingredients can be added and, if required, for example, a condensation catalyst, such as an organotin ester, an organotin chelate complex, an organic titanate, an organotitanium chelate complex, tetramethylguanidylpropyltrimethoxysilane, and tetramethylguanidylpropyltristrimethylsiloxysilane; a storage stabilizer, such as methyltrimethoxysilane, vinyltrimethoxysilane, tetramethoxysilane, methyltripropenoxysilane, vinyltripropenoxysilane, phenyltripropenoxysilane, methyltributanoximesilane, vinyltributanoximesilane, tetrabutanoximesilane, and methyltriacetoxysilane; a reinforcing filler, such as fumed silica, precipitated silica, titanium dioxide, aluminum oxide, quartz powder, carbon powder, talc, and bentonite; a basic filler, such as calcium carbonate, zinc carbonate, zinc oxide, and magnesium carbonate; a fibrous filler, such as asbestos, glass fiber, carbon fiber, and organic fiber; a colorant, such as a pigment and a dye; a heat resistance improver, such as red iron oxide and cerium oxide; a cold resistance improver; a rust preventive; an adhesion improver, such as γ-glysidoxypropyltriethoxysilane; and a liquid reinforcing agent, such as a network polysiloxane consisting of triorganosiloxy units and $SiO_2$ units can be added in prescribed amounts.

Parenthetically, since it is important that the component (B) and the component (C) react as shown in the above equation (1) to produce water that serves as a deep part curing agent, it is natural that the component (B) and the component (C) are selected and used such that such a reaction takes place quickly, and various ingredients that are optionally used are also selected and used such that the production of that water is not impaired.

Since the present composition is cured in the presence of water in the air and simultaneously with the curing, water is produced in deep part, the curing takes place not only from the surface but also from the inside. Thus, the quick curability and the deep curability are improved greatly.

In the case wherein the present composition is made into a two-liquid package and the liquids are mixed when used, the serviceability is quite high because it acquires such a feature that the two liquids are easily mixed in a 1:1 ratio and the components (B) and (C) are readily available.

Uses of the composition

Because of the quick curability and the deep curability, the present composition is suitable for use as an oil seal material for automobiles and also can advantageously be used as a potting material and a sealing material for the electric and electronic fields wherein recently the demand for rationalization of steps is high.

EXAMPLES

In the following Examples and Comparative Examples, the viscosity was measured at 25° C.

Comparative Example 1

100 g of a dimethylpolysiloxane wherein both ends of the molecular chain were blocked with a trimethoxysilyl group and that had a viscosity of 5,000 cSt, 0.2 g of dibutyltin dilaurate, 50 g of precipitated silica, and 8 g of fumed silica were mixed in the absence of water to prepare a curable silicone rubber composition.

This composition was made into a sheet having a thickness of 2 mm and was allowed to stand for 1 hour in an atmosphere of 20° C.–55% RH, but it did not become a rubber elastic product and therefore the rubber physical properties could not be measured in accordance with JIS K 6301.

Also the composition was poured into a glass cylindrical tube having a diameter of 20 mm and a length of 100 mm and was cured for 24 hours in an atmosphere of 20° C.–55% RH. After the curing, the glass tube was broken to take out the cured product and the thickness of the rubberlike elastic part was measured to be 4 mm.

Comparative Example 2

100 g of a dimethylpolysiloxane wherein both ends of the molecular chain were blocked with a trimethoxysilyl group and that had a viscosity of 5,000 cSt, 0.2 g of dibutyltin dilaurate, 0.58 g (0.01 mol) of acetone, 1.79 g (0.01 mol) of γ-aminopropyltrimethoxysilane, 50 g of precipitated silica, and 8 g of fumed silica were mixed in the absence of water to prepare a curable silicone rubber composition.

The composition was made into a sheet having a thickness of 2 mm and was allowed to stand for 1 hour in an atmosphere of 20° C.–50% RH to obtain a rubberlike elastic product, and the rubber physical properties were measured in accordance with JIS K 6301, thereby obtaining the results shown in Table 1. Further, after curing for 24 hours under the same conditions as given above, the cured product was dipped in warm water at 50° C. for 7 days, and the rubber physical properties were measured in accordance with JIS K 6301. The results are also shown in Table 1.

Further, similarly to Comparative Example 1, the composition was cured in a glass cylindrical tube and the thickness of the rubberlike elastic part was measured to be 100 mm.

Example 1

100 g of a dimethylpolysiloxane wherein both ends of the molecular chain were blocked with a trimethoxysilyl group and that had a viscosity of 5,000 cSt, 1.30 g (0.01 mol) of ethyl acetoacetate, 1.79 g (0.01 mol) of γ-aminopropyltrimethoxysilane, 0.2 g of dibutyltin dilaurate, 50 g of precipitated silica, 8 g of fumed silica, 1.0 g of tetramethylguanidylpropyltrimethoxysilane, and 10 g of fumed silica were mixed in the absence of water to prepare a curable silicone rubber composition.

The composition was made into a sheet having a thickness of 2 nm and similarly to Comparative Example 1, a rubberlike elastic product was obtained and the rubber properties were measured. Further, similarly to Comparative Example 2, after dipping in warm water at 50° C. for 7 days, the rubber properties of the rubberlike elastic product were measured. The results are shown in Table 1.

Further, similarly to Comparative Example 1, the composition was cured in a glass cylindrical tube and the thickness of the rubberlike elastic part was measured to be 100 mm.

Comparative Example 3

100 g of a dimethylpolysiloxane wherein both ends of the molecular chain were blocked with a vinyldi(methylethylketoxime)silyl group and that had a viscosity of 20,000 cSt, 1.0 g of dibutyltin dioctoate, and 10 g of fumed silica were mixed in the absence of water to prepare a curable silicone rubber composition.

The composition was made into a sheet having a thickness of 2 mm and was allowed to stand for 1 hour in an atmosphere of 20° C.–50% RH to obtain a rubberlike elastic product, but similarly to Comparative Example 1, it did not become a rubberlike elastic product, and the rubber physical properties could not be measured in accordance with JIS K 6301.

Comparative Example 4

100 g of a dimethylpolysiloxane wherein both ends of the molecular chain were blocked with a vinyldi(methylethylketoxime)silyl group and that had a viscosity of 20,000 cSt, 1.0 g of dibutyltin dioctoate, 0.98 g of cyclohexanone, 2.21 g (0.01 mol) of γ-aminopropyltriethoxysilane, and 10 g of fumed silica were mixed in the absence of water to prepare a curable silicone rubber composition.

The composition was made into a sheet having a thickness of 2 mm and similarly to Comparative Example 1, a rubberlike elastic product was obtained and the rubber properties were measured. Further, similarly to Comparative Example 2, after dipping in warm water at 50° C. for 7 days, the rubber properties of the rubberlike elastic product were measured. The results are shown in Table 1.

Example 2

100 g of a dimethylpolysiloxane wherein both ends of the molecular chain were blocked with a vinyldi(methylethylketoxime)silyl group and that had a viscosity of 20,000 cSt, 1.58 g (0.01 mol) of butyl acetoaceate, 2.21 g (0.01 mol) of γ-aminopropyltriethoxysilane, and 10 g of fumed silica were mixed in the absence of water to prepare a curable silicone rubber composition.

The composition was made into a sheet having a thickness of 2 mm and similarly to Comparative Example 1, a rubberlike elastic product was obtained and the rubber properties were measured. Further, similarly to Comparative Example 2, after dipping in warm water at 50° C. for 7 days, the rubber properties of the rubberlike elastic product were measured. The results are shown in Table 1.

TABLE 1

| | | Comparative Example | | | Example | |
|---|---|---|---|---|---|---|
| | | 1 | 2 | 3 | 4 | 1 | 2 |
| Initial stage | Hardness JIS-A | Measurement was not possible. | 25 | Measurement was not possible. | 20 | 30 | 25 |
| | Elongation (%) | | 300 | | 490 | 280 | 390 |
| | Tensile strength kgf/cm$^2$ | | 13 | | 15 | 16 | 18 |
| After dipping | Hardness JIS-A | — | 8 | | 3 | 29 | 20 |
| | Elongation (%) | — | 100 | | 90 | 250 | 320 |
| | Tensile strength gf/cm$^2$ | — | 2 | | 3 | 14 | 15 |

The hardness was measured by using an A-type spring tester of JIS-K-6301.

Parenthetically, using the curable compositions prepared in Example 1 and Comparative Example 2, sheets having a thickness of 1 mm were formed and were allowed to stand for 24 hours in an atmosphere of 20° C.–55% RH to obtain rubberlike elastic products, and with respect to the obtained cured products, the electrical properties at the initial stage and after dipping in water at 20° C. for 24 hours were measured in accordance with JIS-C-2123. The results are shown in Table 2. From the results shown in Table 2, it can be understood that the cured product obtained from the present composition (Example 2) stably retains almost the electrical properties of the initial stage after dipping in water.

TABLE 2

| | | Volume resistivity ($\Omega \cdot$ cm) | Dielectric breakdown (KV/mm) | Dielectric constant (50 Hz) | Dielectric loss constant (50 Hz) |
|---|---|---|---|---|---|
| Example 1 | Initial stage | $1.4 \times 10^{15}$ | 31 | 3.80 | 0.002 |
| | After dipping in water | $1.2 \times 10^{14}$ | 32 | 2.90 | 0.006 |
| Comparative Example 2 | Initial stage | $2.3 \times 10^{14}$ | 26 | 3.12 | 0.026 |
| | After dipping in water | $6.2 \times 10^{11}$ | 10 | Measurement was impossible. | Measurement was impossible. |

Comparative Example 5

100 g of a polypropylene oxide wherein both ends of the molecular chain were blocked with a vinyldiisopropenoxysilyl group and that had a viscosity of 4,500 cSt, 1.0 g of dibutyltin dimethoxide, and 200 g of calcium carbonate were mixed in the absence of water to prepare a curable composition.

This composition was made into a sheet having a thickness of 2 mm and was allowed to stand for 1 hour in an atmosphere of 20° C.–50% RH, but similarly to Comparative Example 1, it did not become a rubber elastic product and therefore the rubberlike physical properties could not be measured in accordance with JIS K 6301.

Comparative Example 6

100 g of a polypropylene oxide wherein both ends of the molecular chain were blocked with a vinyldiisopropenoxysilyl group and that had a viscosity of 4,500 cSt, 1.0 g of dibutyltin dimethoxide, 2.9 g (0.05 mol) of acetone, 11.1 g (0.05 mol) γ-aminopropyltriethoxysilane, and 200 g of calcium carbonate were mixed in the absence of water to prepare a curable rubber composition.

The composition was made into a sheet having a thickness of 2 mm and similarly to Comparative Example 1, a rubberlike elastic product was obtained and the rubber properties were measured. Further, similarly to Comparative Example 2, after dipping in warm water at 50° C. for 7 days, the rubber properties of the rubberlike elastic product were measured. The results are shown in Table 3.

Example 3

100 g of a polypropylene oxide wherein both ends of the molecular chain were blocked with a vinyldiisopropenoxysilyl group and that had a viscosity of 4,500 cSt, 1.0 g of dibutyltin dimethoxide, 5.00 g (0.05 mol) of acetylacetone, 11.1 g (0.05 mol) of γ-aminopropyltriethoxysilane, and 200 g of calcium carbonate were mixed in the absence of water to prepare a curable rubber composition.

The composition was made into a sheet having a thickness of 2 mm and similarly to Comparative Example 1, a rubberlike elastic product was obtained and the rubber properties were measured. Further, similarly to Comparative Example 2, after dipping in warm water at 50° C. for 7 days, the rubber properties of the rubberlike elastic product were measured. The results are shown in Table 3.

TABLE 3

| | | Comparative Example 5 | Comparative Example 6 | Example 3 |
|---|---|---|---|---|
| Initial stage | Hardness JIS-A | Measurement was | 25 | 30 |
| | Elongation (%) | | 250 | 300 |

TABLE 3-continued

|   |   | Comparative Example 5 | Comparative Example 6 | Example 3 |
|---|---|---|---|---|
|   | Tensile strength kgf/cm² | impossible. | 12 | 17 |
| After dipping | Hardness JIS-A | — | 8 | 28 |
|   | Elongation (%) | — | 50 | 350 |
|   | Tensile strength kgf/cm² | — | 2 | 15 |

Parenthetically, using the curable compositions prepared in Example 3 and Comparative Example 6, sheets having a thickness of 1 mm were formed and were allowed to stand for 24 hours in an atmosphere of 20° C.–55% RH to obtain rubberlike elastic products, and with respect to the obtained cured products, the volume resistivity at the initial stage and after dipping in water at 20° C. for 24 hours was measured in accordance with JIS-C-2123.

TABLE 4

|   |   | Volume resistivity (Ω · cm) |
|---|---|---|
| Example 3 | Initial stage | $5.0 \times 10^{11}$ |
|   | After dipping in water | $3.0 \times 10^{10}$ |
| Comparative Example 6 | Initial stage | $4.5 \times 10^{11}$ |
|   | After dipping in water | Measurement was impossible. |

What is claimed is:

1. A room temperature quick curable composition, comprising
   (A) a diorganopolysiloxane or a polyoxyalkylene polymer wherein both ends of the molecular chain are blocked with a hydrolyzable silyl group and that has a viscosity of 25 to 1,000,000 centistokes at 25° C.,
   (B) a carbonyl compound having at least two carbonyl groups in the molecule, with one carbonyl group being in the beta position relative to the other carbonyl group, and
   (C) an organic compound having at least one $NH_2$ group in the molecule, with said components (B) and (C) being selected such that said carbonyl group in the beta position and the $NH_2$ group are reactive with each other.

2. A room temperature quick curable composition as claimed in claim 1, wherein said component (A) is a diorganopolysiloxane that is represented by the following general formula (2):

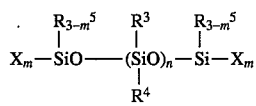

wherein $R^3$, $R^4$, and $R^5$, which are the same or different, each represent an unsubstituted or substituted monovalent hydrocarbon group, X represents a hydrolyzable group, m is an integer of 1 to 3, and n is a positive integer, and has a viscosity of 25 to 1,000,000 centistokes at 25° C.

3. A room temperature quick curable composition as claimed in claim 1, wherein said component (A) is a polyoxyalkylene polymer represented by the following general formula (3):

$$X_{3-q}R^7{}_qSi-(R^6O)_p-SiR^7{}_rX_{3-r} \qquad (3)$$

wherein $R^6$'s independently each represent a hydrogen atom or a linear or branched alkyl group having 2 to 12 carbon atoms, $R^7$'s independently represent a monovalent organic group, X has the same meaning as defined above, p is an integer of 1 to 500, and q and r are each an integer of 0 or 1.

4. A room temperature quick curable composition as claimed in claim 3, wherein the oxyalkylene unit constituting the backbone chain of the polyoxyalkylene polymer represented by said general formula (3) is $-CH_2CH_2O-$, $-CH_2CH(CH_3)O-$, $-CH_2CH(CH_2CH_3)O-$, or $-CH_2CH_2CH_2CH_2O-$.

5. A room temperature quick curable composition as claimed in claim 1, wherein said component (B) is an acetoacetate ester or a diketone.

6. A room temperature quick curable composition as claimed in claim 1, wherein said component (B) is a silane coupling agent having, as a functional group, a group with two carbonyl groups with one carbon atom in between.

7. A room temperature quick curable composition as claimed in claim 1, wherein said component (C) is an amino group containing organic compound in which the alpha carbon atom of the amino group is a primary or secondary carbon atom.

8. A room temperature quick curable composition as claimed in claim 1, wherein said component (C) is an amino group containing organic compound in which the alpha carbon atom of the amino group is part of an aromatic ring.

9. A room temperature quick curable composition as claimed in claim 1, wherein said component (B) is blended in such an amount that the amount of the carbonyl group in the beta position is 0.001 to 1 mol per 100 g of the component (A), and said component (C) is blended in such an amount that the amount of the $NH_2$ group is 0.001 to 1 mol per 100 g of the component (A).

10. A cured product obtained by curing a curable component as claimed in claim 1.

* * * * *